United States Patent [19]

Dennis

[11] Patent Number: 4,885,343

[45] Date of Patent: Dec. 5, 1989

[54] PREPARATION OF TRIBLOCK COPOLYMERS

[75] Inventor: Kent S. Dennis, Midland, Mich.

[73] Assignee: The Dow Chemical Company, Midland, Mich.

[21] Appl. No.: 318,788

[22] Filed: Mar. 3, 1989

Related U.S. Application Data

[63] Continuation of Ser. No. 33,444, Apr. 1, 1987, Pat. No. 4,839,430.

[51] Int. Cl.[4] ............................................. C08L 297/02
[52] U.S. Cl. ..................................... 525/280; 525/242; 525/271; 525/901; 525/941
[58] Field of Search ................. 525/280, 271, 292, 941

[56] References Cited

U.S. PATENT DOCUMENTS

| | | | |
|---|---|---|---|
| 3,598,887 | 8/1971 | Darcy et al. | 525/271 |
| 3,639,523 | 2/1972 | Hayter et al. | 525/280 |
| 3,770,712 | 11/1973 | Schwab | 525/280 |
| 3,891,721 | 6/1975 | Prudence | 525/271 |
| 3,956,426 | 5/1976 | Shepers | 525/271 |
| 3,959,412 | 5/1976 | Oberlin | 525/271 |
| 3,992,483 | 11/1976 | Willis | 525/271 |
| 4,010,226 | 3/1977 | Crossland | 525/271 |
| 4,172,100 | 10/1979 | Tung et al. | 585/25 |
| 4,196,153 | 4/1980 | Tung et al. | 260/665 |
| 4,196,154 | 4/1980 | Tung et al. | 260/665 |

FOREIGN PATENT DOCUMENTS 1400497 7/1975 United Kingdom.

OTHER PUBLICATIONS

Quirk et al., "Rational Synthesis of Starblock Copolymers with Compositionally Heterogenous Arms", Apr. 1986, Polymer Preprints, vol. 27, pp. 188–189.

Hsieh, H., "A Synthesis of Radial Thermoplastic Elastomers", Apr. 27–30, 1976, pp. 1305–1310.

Primary Examiner—Carman J. Seccuro

[57] ABSTRACT

Block copolymers are prepared by providing an initial anionically polymerizable monomer portion; anionically polymerizing the initial monomer portion to provide polymer chains with living ends, and contacting the polymer chains with m-bis(phenyletheynl)benzene (PEB), a coupling agent, to bring about substantial coupling. In preferred embodiments the polymer chain living ends are capped with an α-alkylstyrene or a ring-alkyl substituted α-alkylstyrene, wherein the α-alkyl groups contain between about 1 to about 20 carbon atoms. and the ring-alkyl groups have at least 2 carbon atoms. The coupling agents employed with the capped polymer chain living ends include PEB, p-dibromoxylene, terephthaloyl chloride, 1,4-dibromobutene; and the multifunctional epoxides, multifunctional isocyanates, multifunctional aziridines, multifunctional aldehydes, multifunctional ketones, multifunctional anhydrides, multifunctional esters, and polyhalides.

20 Claims, No Drawings

PREPARATION OF TRIBLOCK COPOLYMERS

This is a continuation of application Ser. No. 033,444, filed Apr. 1, 1987, now U.S. Pat. No. 4,839,430.

BACKGROUND OF THE INVENTION

A wide variety of block copolymers are prepared anionically, for example, by the polymerization of a single monomer to completion, utilizing organolithium compounds as polymerization initiators. The polymer chain produced has at least one active or living end, to provide a so-called "living polymer". Once the living polymer has been prepared, a second monomer is added and polymerization initiated by the living polymer to provide a block copolymer which, for practical purposes, consists of homopolymer segments. Difunctional initiators having two, or polyfunctional initiators having three or more, polymerization initiating sites, such as a polylihtium compound, can be employed to prepare a variety of block copolymer structures. Many of such polymers are useful for a variety of purposes such as oxidatively-resistant thermoplastic elastomers, membranes, and thickeners or surfactants in water solutions.

Employing known anionic polymerization process techniques for block polymer preparations effectively excludes a wide variety of monomers, and their benefits, from incorporation into block copolymers.

For example, block copolymers having an ABA configuration are often prepared to have end, or A, blocks of an aromatic monomer block such as styrene, α-methylstyrene, or mixtures thereof; and the center, or B, block to have an elastomeric polymer block of an unsaturated diene such as butadiene, isoprene, or mixtures thereof. Such block polymers are readily prepared by polymerizing the center block first and then adding a second monomer to form the end blocks. However, the above technique is inconvenient for making triblock copolymers having butadiene end blocks and a styrene center block, and very difficult, because of the viscosity, for making triblock copolymers having styrene ends blocks and center blocks of polyvinylpyridines.

Poly(4-vinylpyridine) is not soluble in most solvents suitable for anionic polymerization. It can be made in pyridine, but styrene will not polymerize anionically in the presence of pyridine. It is possible to polymerize 2-vinylpyridine in a solvent such as benzene and then add styrene to form the end blocks, but the living styrene anions attack the pyridine segments and terminate or crosslink the chain. It is possible to make triblock polymers having polybutadiene as the center block by first polymerizing the center diene block and then adding styrene. If the 1,4-configuration of the polydiene is to be maintained, the polymerizing medium must be strictly non-polar. However, this leads to very high viscosities because of association of the polydienyl lithium ends.

In order to make triblock polymers having polymerized aromatic monomer end blocks and a polyvinylpyridine center block, it is necessary to make a diblock polymer first and then couple it. Conventional coupling reactions for such triblock polymers are generally effective only if the molecular weight of the first polymer chain is low, i.e., between about 10,000 to 20,000. Although not limited by theory, it is postulated that a proton transfer side reaction occurs in the coupling reaction. Because of the smaller number of living ends and the slower rates of reaction inherent with higher moleculur weights, coupling of higher molecular weight polymers becomes limited in such conventional techniques. Thus, conventional anionic polymerization techniques limit the type of monomers which can be employed in preparing such types of block copolymers.

It would be advantageous if there were available an improved process for the preparation of block copolymers.

It would also be desirable if there were available an improved process for the preparation of block copolymers which would permit the inclusion of monomers which are generally difficult for anionic polymerization.

SUMMARY OF THE INVENTION

These benefits and other advantages are achieved in accordance with the present invention. In one embodiment the present invention is a method for the preparation of block copolymer of the ABA configuration, the steps of the method comprising (a) providing an initial portion of anionically polymerizable monomer selected from the group consisting of styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene, vinylpyridine, butadiene, dimethylbutadiene, isoprene, piperylene, mono- or diortho-, halo-substituted styrenes, or conventional combinations thereof; (b) anionically polymerizing the initial monomer portion to provide initial polymer chains having living ends; (c) optionally, contacting the polymer chains with a second anionically polymerizable monomer portion selected from the same group as the initial anionically polymerizable monomer, provided that wherein the second monomer portion is used, it is polymerized in the presence of the polymer chains; and (d) coupling the polymer chains with m-bis(phenylethenyl) benzene (PEB) to bring about substantial coupling.

In a preferred embodiment the invention is a method for the preparation of block copolymer of the ABA configuration, the steps of the method comprising (a) providing an initial anionically polymerizable monomer portion selected from the group consisting of styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene, vinylpyridine, butadiene, dimethylbutadiene, isoprene, piperylene, mono- or diortho-, halo-substituted styrenes, or conventional combinations thereof; (b) anionically polymerizing the initial monomer portion to provide initial polymer chains having living ends; (c) contacting said initial polymer chains with up to at least a quantity sufficient to react with a substantial proportion of said polymer chain livign ends of an α-alkylstyrene or a ring-alkyl substituted α-alkylstyrene, wherein the α-alkyl groups contain between about 1 to about 20 carbon atoms, and the ring-alkyl groups have at least 2 carbon atoms; and (d) coupling the polymer chains with a difunctional coupling agent to bring about substantial coupling.

In another preferred embodiment the invention is a method for the preparation of a radial block copolymer of the $AB(BA)_n$ configuration, wherein n is an integer $\geq 1$, the steps of the method comprising (a) providing an initial anionically polymerizable monomer portion selected from the group consisting of styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene, vinylpyridine, butadiene, dimethylbutadiene, isoprene, piperylene, mono- or diortho-, halo-substituted styrenes, or conventional combinations thereof; (b) anionically polymerizing the initial monomer portion to provide initial polymer chains having living ends; (c) contacting said initial polymer chains with up to at least a quantity sufficient to react with a substantial proportion of said polymer chain living ends of an α-alkylstyrene or a ring-alkyl substituted α-alkylstyrene, wherein the α-alkyl groups contain between about 1 to about 20 carbon atoms, and the ring-alkyl groups have at least 2 carbon atoms; and (d) coupling the polymer chains with a multifunctional coupling agent selected from the group consisting of the multifunctional epoxides; multifunctional isocyantes; multifunctional aziridines; multifunctional aldehydes; multifunctional ketones; multifunctional anhydrides; multifunctional esters; and polyhalides to bring about the preparation of coupled polymer chains.

DETAILED DESCRIPTION

The type of block copolymers suitable for use in the present invention are linear block(s) of the or ABA configuration, or a radial block copolymer of the AB(-BA)$_n$ configuration, wherein n is an integer $\geq 1$. Preferably, n is less than 100, more preferably less than 20.

In attempting to make a triblock polymer having polystyrene end blocks of molecular weight of greater than 20,000, the coupling efficiencies decrease. The efficiency of a coupling reaction is affected by the degree of polymerization (DP), which is the number of monomer units in an average polymer molecule in a given sample. Increasing the degree of polymerization not only increases the viscosity of the mixture but also decreases the concentration of living ends. This phenomenon becomes significant about the time DP is above 100. Consequently, when the DP of the anionically polymerized monomer is even at a moderate level, e.g., DP in excess of 1,000, it becomes very difficult to couple such higher molecular weight polymers.

Suitable copolymers according to the present invention include block copolymers having an average molecular weight in the approximate range of from about 1000 to about 200,000, a preferred range being from about 20,000 to about 150,000. It should be noted that molecular weight throughout this specification shall mean number average molecular weight. Methods for determining number-average molecular weight are wellknown to those in the art, as will be set forth below.

Examples of anionically polymerizable monomers which may be used for synthesizing the name copolymers include: styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene, vinylpyridine, butadiene, dimethylbutadiene, isoprene, piperylene, and mono- or diortho halo substituted styrenes and the like, or conventional combinations thereof.

Anionic polymerization is well known in the art. The *Kirk-Othmer Encyclopedia of Chemical Technoloyg*, 3rd edition, (1980), sets forth a general description of the method.

A wide variety of polymerization initiators may be employed for anionic polymerization of the monomers in accordance with the present invention and these beneficially include organolithium compounds. The organolithium compounds used correspond to the formula $R(Li)_x$, wherein R is a hydrocarbon radical selected from the group consisting of aliphatic, cycloaliphatic and aromatic radicals and x is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds.

Examples of lithium-hydrocarbon initiators employed in the invention are ethyllithium, isoproyllithium, cyclohexyllithium, phenyllithium and benzyllithium. Preferably a monolithium-alkyl compound, where alkyl is of 2 to 6 carbon atoms, is employed, n-butyllithium and sec-butyllithium being particularly preferred.

The polymerization of the monovinyl-aromatic compounds is carried out in solution in a conventional inert hydrocarbon solvent. In selecting a solvent, it should be selected in general for the polymer formed; it should be generally non-reactive under conditions employed for polymerization; and it should not have an undesired tendency to act as a chain-terminating or transfer agent. Exemplary solvents include aliphatic cycloaliphatic or aromatic hydrocrabons. Preferred of such solvents are those which are liquid under the reaction conditions and are preferably of 4 to 12 carbon atoms. Suitable aliphatic, cycloaliphatic or aromatic hydrocarbons solvents include hexane, cyclohexane, benzene, or toluene.

The concentration of the monomers in the reaction solution is not crictical and can be adjusted so as to allow any desired apparatus to be used for the polymerization.

The polymerization is carried out under the conventional conditions for anionic polymerization with lithium-organic compounds, for example under an inert gas atmosphere, with exclusion of air and moisture.

Polymerization conditions generally known to the art can be suitably employed. The polymerization temperature can vary over a broad range and may be from about $-78°$ C. to 150° C., and is preferably kept at a temperature in the range of from about 0° C. to 100° C.

The anionic polymerization of the monomer involves a "living mechanism". By this is meant that as polymerization proceeds each polymer chain remains "living" with a terminal group capable of entering into further polmerization reaction even when the monomer supply is consumed. For example, initiation and polymerization are conventionally represented with the initiator moiety located at one end of the polymer chain, which remains living even when the monomer supply is consumed. This gives a solution of living polymers of the monovinyl aromatic compounds, each possessing one active terminal lithium-carbon bond, which is capable of polymerization on further addition of monomers.

Another desirable variety of lithium initiators are the difunctional lithium compounds suitable for the preparation of block copolymers of the ABA configuration. Such initiators are prepared by the addition of at least 2 moles of an alkyl lithium, such as sec-butyllithium, tert-butyllithium, and the like, to 1 mole of an aromatic diethenyl compound. The organolithium compound adds to the double bonds to provide the desired polymerization-initiating compound. The resulting dilithium compound becomes more soluble on contact with a small amount of butadiene on isoprene in an aliphatic, cycloaliphatic or aromatic hydrocarbon solvent such as hexane, cyclohexane, benzene, or toluene. Such processes are well known in the art and are set forth in U.S.

Pat. Nos. 4,169,115; 4,196,153; 4,205,016; 4,172,190; 4,200,718.

The amount of initiator used in the preparation of block copolymers by anionic polymerization can vary over a wide range, but will generally be at least 0.0001 mole of the organolithium compound per 100 moles of monomers including in the aggregate monomers of all types to be polymerized in the process. The upper limit for the amount of organolithium used depends primarily upon initiator solubility and the desired molecular weight of the polymer resulting from the polymerization. A preferred effective initiator level is from about 0.01 to about 1 mole organolithium per 100 moles of monomers of all types in total charged to the polymerization zone.

Polymerization is taken to virtually complete conversion of the monovinyl aromatic compounds employed. The terminal initiator moieties of the initial polymer chains, unless chemically deactivated are capable of initial poymer chains may be contacted with a post-polymerization anionically polymerizable monomer portion containing the same or different monomers as the initial portion, with subsequent polymerization; may be coupled using di- and multifunctional coupling agents with other anionically polymerized polymer chains, with resultant chain linking; and may be coupled and contacted with a post-coupled anionically polymerizable monomer portion containing the same or different monomers as the initial portion, with subsequent polymerization.

An optional polymerization technique includes providing at least one post-polymerization anionically polymerizable monomer portion and anionically polymerizing said monomer portion in the presence of the coupled polymer active end. The post-polymerization anionically polymerizable monomer portion is selected from the same group as the initial anionically polymerizable monomer portion.

In one embodiment of this invention, the initial anionically polymerized monomer portion may be coupled with m-bis(phenylethenyl)benzene (PEB) to form a block copolymer of the ABA, or a radial block copolymer of the AB(BA)$_n$ configuration, wherein n is an integer $\geq 1$.

In a preferred embodiment, the initial polymer chains, subsequent to polymerization, are capped prior to coupling. By "capping" is meant that a monomer is introduced at a specifically located functional group, i.e., the "living" end of the initial polymer chain, which is useful for the subsequent preparation of block copolymers.

Surprisingly, it has been found that the efficiency of subsequent coupling reactions may be increased if substantial proportions of the polymers are terminated, or capped, with a sterically hindered monomer. Although not intended to be bound by theory, it is belived that suitable capping monomers exert a steric shielding effect and cut down on the amount of proton transfer side reactions during coupling. However, a capping monomer with the alpha group which is too bulky does not permit efficient coupling, e.g., the two phenyl groups on 1,1-diphenylethylene are probably too bulky.

Advantageously, the sterically-hindered capping monomer is an α-alkylstyrene or a ring-alkyl substituted α-alkylstyrene, wherein the α-alkyl groups contain between about 1 to about 20 carbon atoms, preferably about 1 to about 4 carbon atoms, and the ring-alkyl groups have at least 2 carbon atoms. Exemplary monomers include α-alkyl styrenes (such as α-methylstyrene, α-ethylstyrene and the like); ring-alkyl substituted alkylstyrenes, (such as mono- and diortho-, mono- and dimeta-, and para-alkyl α-alkylstyrenes, and α-methyldialkyl styrene, wherein the ring-substituted alkyl group has at least two carbons. Preferably, the α-alkylstyrene is α-methylstyrene or α-ethylstyrene; and the ring-alkyl substituted α-alkylstyrene is an orthoethyl-α-alkylstyrene, para-ethyl-α-alkylstyrene, or para-tertiary butyl-α-alkylstyrene. The particularly preferred capping monomer is α-methylstyrene.

The solution is then contacted with the coupling mixture. The coupling mixture comprises a coupling agent in a solvent. It is to be understood that subsequent reference to coupled polymers will be in terms of the A and B blocks, although the coupling agent is present in a minor proportion of the polymer chain backbone.

It is essential in choosing coupling agents in accordance with the present invention that the coupling reaction be efficient.

In one embodiment, the preparation of a block copolymer of the ABA configuration may be achieved by contacting the polymer with a difunctional coupling agent in a solvent. In making triblock polymers, an inefficient reaction would yield a final polymer mixture of a triblock diluted with a diblock which may not have the potential properties of the pure triblock.

Suitable coupling agents include, in solution, the dibromo compounds; diacid chlorides; diacid bromides; dichloro compounds; diesters; diphenylethenyl aromatics. Preferred coupling agents include terephthaloyl chloride; α,α'-dibromoxylene; 1,4-dibromobutene; and m-bis(phenylethenyl)benzene (PEB).

When choosing the solvent it is, of course, necessary that the coupling agent is soluble therien and further that it be generally non-reactive under conditions employed for coupling. Useful solvents include hydrocarbons, aliphatic and aromatics as well as cycloaliphatic, such as hexane, benzene, ehtylbenzene, toluene, and cyclohexane; and also include glymes and other ethers.

Although benzene is a preferred solvent for PEB, coupling of the capped chains is generally improved by the addition of a polar solvent. Exemplary polar solvents include ethers such as ethyl ether, diisopropyl ether, tetrahydrofuran, dioxane, and the dimethyl ether of ethylene glycol. Particularly preferred solvents are tetrahydrofuran, and the dimethyl ether of ethylene glycol or mixtures thereof.

It is also possible to prepare a radial block copolymer of the AB(BA)$_n$ configuration, wherein n is an integer $\geq 1$. This is achieved by contacting the initial polymer chains with a multi-functional coupling agent. Coupling agents suitable for use in the process of this invention are those containing at least three reactive sites, the same or differing, which will react with the alkali metal moiety of the initial polymer chains. The multi-functional coupling agents utilized according to this invention may be branched with the branching being terminated with at least three reaction sites for reaction at multiple positions. Radial block polymers result when polymerizations are terminated in the presence of these coupling agents. Generally suitable multifunctional coupling agents and their preparation are shown in the following U.S. Patents, the teachings of which are incorporated by reference hereto: U.S. Pat. Nos. 3,281,383; 3,959,412; 4,049,753; 4,091,053; and 4,584,346. Exemplary of these multifunctional coupling agents are the multifunctional epoxides, multifunctional isocyanates, multifunctional aziridines, multifunctional aldehydes, multifunctional ketones, multifunctional anhydrides, multifunctional esters, and polyhalides. Specific polyhalides include the silicon halides and halosilanes.

When m-bis(phenylethenyl)benzene is used to couple the living polymer chains, to carbanionic initiator sites are retained in the coupled products. Consequently, known so-called star, or radial, block copolymers may be prepared by the addition of further monomer to the coupled solution.

A suitable technique includes providing at least one post-coupling anionically polymerizable monomer portion and anionically polymerizing said monomer portion in the presence of the coupled polymer active end. The post-coupling anionically polymerizable monomer portion is selected from the same group as the initial anionically polymerizable monomer portion.

The star-branched polymers according to the present invention are particularly useful for the preparation of thermoplastic elastomers and impact resistant thermoplastic resinous polymers.

The molecular weights of the samples are analyzed by gel permeation chromatography (GPC) as described by the method in J. Applied Polymer Science, 13, 2359 (1969) Runyon et al., which is hereby incorporated by reference.

The molecular weight may also be determined using viscometry. Using a viscometer the inherent viscosity, $\eta_{inh}$, of the sample is determined. Inherent viscosity is calculated using the following expression: $\eta_{inh}=(\ln \eta_r)/$concentration, whereby $\eta_r =$flow time of the polymer solution (time$_s$)/flow time of the solvent (time$_o$), and concentration is expressed in grams/deciliter(g/dl).

The present invention is further illustrated, but not limited, by the following examples. All parts and percentages are by weight.

EXAMPLES

The following procedure is used in each of the examples specifically enumerated below with the only changes being in the monomers, coupling agents and solvents used, and whether the anionically polymerized monomers are capped prior to coupling.

All monomers and reagents are purified according to standard procedures used in anionic polymerization. The reactions and polymerizations are conducted under a dry nitrogen atmosphere. All glass containers are baked at 150° C. overnight, and flushed with nitrogen before use. The transfer of monomers and reagents is carried out with nitrogen-flushed syringes.

Polymerizations are done in a 500 ml flask. The flask is equipped with a stirrer, an outlet to the nitrogen line, and a third outlet used for adding reagents and pumping.

For each reaction, the flask contains 130 ml of benzene, and 0.22 moles of anionically polymerizable monomer to make a DP of 1000. It is cooled in an ice bath and degassed for two minutes under vacuum with rapid stirring. Any trace amounts of impurities in the reagents are titrated out of the solution by adding about 0.4 N n-BuLi in benzene, until a faint yellow color persists for five minutes. This usually requires about 0.1 to about 0.3 ml of n-BuLi.

Then about 0.21 milliequivalents of sec-BuLi is added to initiate polymerization of the monomer to the desired DP. At this point, a bath of luke warm water is placed around the flask. The polymerization takes about 12 minutes and the temperature of the flask rises to about 45°–50° C.

After about 20 minutes an 11-ml sample is withdrawn from the flask by a syringe for analysis of molecular weight by GPC, and viscosity using a Schott Automatic Viscometer.

A slight excess over stoichiometric quantity of crystalline coupling agent is placed into the receiver of a distillation apparatus which is then attached to a vacuum line, evacuated and then filled with nitrogen, heated with a heat gun, and reevacuated. About 100 ml of solvent is added to the distillation apparatus and degassed under vacuum. The solvent is distilled under vacuum into the receiver on to the coupling agent.

After preparing the coupler solution, enough of the solution of coupling agent is added to the flask by syringe to join the remaining polymer molecules. The coupling solution comprises 0.21 milliequivalents of coupling agent, which is a stoichiometric amount relative to the initiator.

After this the solution is usually colorless. A sample of the resultant mixture is withdrawn from the vessel by a syringe, precipitated in methyl alcohol, and checked for molecular weight by GPC and viscometry, using a Schott Automatic Viscometer.

EXAMPLE 1

The anionically polymerizable monomer employed is styrene. Additionally, a solution of 0.21 milliequivalents of PEB in benzene is used as the coupler.

Inherent viscosity is calculated using the formula $\eta_{inh}=(\ln \eta_r)/c$, whereby $\eta_r=$time$_s$/time$_o$.

After containing $\eta_{inh}$, the weight average degree of polymerization (DP$_w$) is determined from the following relationship, which is specific for polystyrene:

$$DP_w = 3057.09 \, (\eta_{inh})^{1.39144}$$

The solvent used is toluene, the concentration is 0.100 g/dl and the temperature is 25° C.

All values obtained are in molecular weight units. The results of Example 1 are set forth in Table 1.

EXAMPLE 2

The procedure of Example 1 is followed except that about 0.25 ml. of purified α-methylstyrene is contacted with the polystyrl anions several minutes before the coupling solution is added.

EXAMPLE 3

The procedure of Example 2 is followed except that a solution of 0.21 milliequivalents of terephthaloyl chloride benzene is used as the coupler.

All values obtained are in molecular weight units. The results of Example 3 are set forth in Table 1.

EXAMPLES 4 AND 5

The procedure of Example 2 is followed except that a solution of 0.21 milliequivalents of p-dibromoxylene (p-Br$_2$Xyl) in tetrahydrofuran is used as the coupler instead of a 0.21 milliequivalent solution of PEB in benzene.

All values obtained are in molecular weight units. The results of Examples 4 and 5 are set forth in Table 1.

EXAMPLE 6

The procedure of Example 2 is followed except that a solution fo 0.21 milliequivalents of dibromoxylene benzene is used as the coupler.

All values obtained are in molecular weight units. The results of Example 6 are set forth in Table 1.

EXAMPLE 7

The procedure of Example 6 is followed except that to the solution is added about 1.4% of tetrahydrofuran immediately prior to coupling.

All values obtained are in molecular weight units. The results of Example 7 are set forth in Table 1.

TABLE 1

| Example | Coupling Agent (solvent) | Capping Agent (alpha-methyl-styrene) | Percent coupled (GPC) | Percent Coupled (viscometry) |
|---|---|---|---|---|
| 1 | PEB(benz) | 0 ml | 80.6 | 72.0 |
| 2 | PEB(benz) | 0.25 ml | | |
| | (0.5 hr) | | 72.3 | 83.4 |
| | (18 hr) | | 84.3 | 109.2 |
| 3 | terephthaloyl Cl (benz) | 0.25 ml | dicoupled 46.3 tricoupled 33.0 | 107.4 |
| 4 | p-Br$_2$Xyl(THF) | 0.25 ml | 79.6 | 88.9 |
| 5 | p-Br$_2$Xyl(THF) | 0.25 ml | 82.4 | 84.7 |
| 6 | p-Br$_2$Xyl(benz) | 0.25 ml | 72.4 | 72.1 |
| 7 | p-Br$_2$Xyl(benz & 1.4% THF) | 0.25 ml | 94.5 | 78.6 |

EXAMPLE 8

The procedure of Example 1 is repeated with the following exception. After anionic polymerization of the polystyrene, 5 grams of 4-vinylpyridene in benzene are admixed into the flask and anionic polymerization is conducted again. Thereafter, the polymer chains are coupled with PEB as set forth in Example 1.

The coupling percentages obtained in Example 8 are substantially similar to the results achieved in Example 1. The weight average degree of polymerization ($DP_w$) is determined using a modification of the formula used for polystyrene.

EXAMPLES 9-14

The procedures of Examples 2-7 are repeated, respectively, in Examples 9-14, with the following exception. After anionic polymerization of the polystyrene, 5 grams of 4-vinylpyridene in benzene are admixed into the flask and anionic polymerization is conducted again. Thereafter, the polymer chains are capped and coupled as set forth in Examples 2-7.

The coupling percentages obtained in Examples 9-14 are substantially similar to the results achieved in Examples 2-7. The weight average degree of polymerization ($DP_w$) is determined using a modification of the formula used for polystyrene.

I claim:

1. A method for the preparation of block copolymer of the ABA configuration, the steps of the method comprising:
    (a) providing a first anionically polymerizable monomer portion used in polymerizing the A block polymer chains, which first monomer portion has at least one vinyl pyridine monomer or combinations thereof with at least one monomer selected from the group consisting of styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene, butadiene, dimethylbutadiene, isoprene, piperylene, mono- or diortho-, halo-substituted styrenes,;
    (b) anionically polymerizing the first monomer portion to provide A block polymer chains having living ends;
    (c) contacting the A block polymer chains with a second anionically polymerizable monomer portion used in polymerizing the B block polymer chain, which second monomer portion has at least one monomer selected from the group consisting of styrene, m-ethylstyrene, 2,4-diethylstyrene, m-isopropylstyrene, butadiene, dimethylbutadiene, isoprene, piperylene, mono- or diortho-, halo-substituted styrenes, or combinations thereof, provided that at least one monomer selected from the second monomer portion is different from at least one monomer selected from the first monomer portion;
    (d) anionically polymerizing the second monomer portion in the presence of the A block polymer chains to form A-B block polymer chains having living ends;
    (e) contacting said A-B block polymer chains with up to at least a quantity sufficient to react with a substantial proportion of said polymer chain living ends of an α-alkylstyrene or a ring-alkyl substituted α-alkylstyrene, wherein the α-alkyl groups contain between about 1 to about 20 carbon atoms, and the ring-alkyl groups have at least 2 carbon atoms; and
    (f) coupling the A-B block polymer chains with a difunctional coupling agent to bring about substantial coupling.

2. The method according to claim 1 wherein the first monomer portion is a vinylpyridine and the second monomer portion is styrene.

3. The method according to claim 1 further comprising contacting the initial polymer chains before step (c) with at least one post-polymerization anionically polymerizable monomer portion selected from the same group as the initial anionically polymerizable monomer portion, provided that wherein at least one post-polymerization anionically polymerizable monomer portion is used, each portion is polymerized in the presence of the initial polymer chains.

4. The method according to claim 1 wherein the α-alkylstyrene has alkyl groups containing between about 1 to about 4 carbon atoms.

5. The method according to claim 1 wherein the α-alkylstyrene is selected from the group consisting of α-methylstyrene and α-ethylstyrene.

6. The method according to claim 5 wherein the ring-alkyl substituted α-alkylstyrene is selected from the group consisting of mono- and diortho-, mono- and dimeta-, and para-alkyl-, α-alkylstyrenes, and α-methyldialkyl styrene, wherein the ring-substituted alkyl group has at least two carbons.

7. The method according to claim 6 wherein the ring-alkyl substituted α-alkylstyrene is selected from the group consisting of ortho-ethyl-α-alkylstyrene, para-ethyl-α-alkylstyrene, or para-tertiary butyl-α-alkylstyrene.

8. The method according to claim 1 wherein the coupling agent is selected from the group p-dibromoxylene, terephthaloyl chloride, and 1,4-dibromobutene.

9. The method according to claim 8 wherein the coupling agent is in admixture with a polar solvent.

10. The method according to claim 9 wherein the polar solvent is selected from the group consisting of tetrahydrofuran and ethylene glycol dimethyl ether.

11. The method according to claim 1 wherein the coupling agent is m-bis(phenylethenyl)benzene.

12. A method for the preparation of a radial block copolymer of the AB(BA)$_n$ configuration, wherein n is an integer $\geq 1$, the steps of the method comprising:
 (a) providing a first anionically polymerizable monomer portion used in polymerizing the A block polymer chains, which first monomer portion has at least one vinyl pyridine monomer or combinations thereof with at least one monomer selected from the group consisting of styrene, α-methylstyrene, m-ethylstyrene, p-methoxy-α-methylstyrene, p-ethyl-α-methylstyrene, p-ethyl-α-ethylstyrene, 2,4-diethylstyrene, m-isopropylstyrene, butadiene, dimethylbutadiene, isoprene, piperylene, mono- or diortho-, halo-substituted styrenes,;
 (b) anionically polymerizing the first monomer portion to provide A block polymer chains having living ends;
 (c) contacting the A block polymer chains with a second anionically polymerizable monomer portion used in polymerizing the B block polymer chain, which second monomer portion has at least one monomer selected from the group consisting of styrene, m-ethylstyrene, 2,4-diethylstyrene, m-isopropylstyrene, butadiene, dimethylbutadiene, isoprene, piperylene, mono- or diortho-, halo-substituted styrenes, or combinations thereof, provided that at least one monomer selected from the second monomer portion is different from at least one monomer selected from the first monomer portion;
 (d) anionically polymerizing the second monomer portion in the presence of the A block polymer chains to form A-B block polymer chains having living ends;
 (e) contacting said A-B block polymer chains with up to at least a quantity sufficient to react with a substantial proportion of said polymer chain living ends of an α-alkylstyrene or a ring-alkyl substituted α-alkylstyrene, wherein the α-alkyl groups contain between about 1 to about 20 carbon atoms, and the ring-alkyl groups have at least 2 carbon atoms; and
 (f) coupling the A-B block polymr chains with a multifunctional coupling agent selected from the group consisting of the multifunctional epoxides; multifunctional isocyanates; multifunctional aziridines; multifunctional aldehydes; multifunctional ketones; multifunctional anhydrides; multifunctional esters; and polyhalides to bring about the preparation of coupled polymer chains.

13. The method according to claim 12 wherein the first monomer portion is a vinylpyridine and the second monomer portion is styrene.

14. The method according to claim 12 further comprising contacting the initial polymer chains before step (c) with at least one post-polymerization anionically polymerizable monomer portion selected from the same group as the initial anionically polymerizable monomer portion, provided that wherein at least one post-polymerization anionically polymerizable monomer portion is used, each portion is polymerized in the presence of the initial polymer chains.

15. The method according to claim 14, wherein the α-alkylstyrene has alkyl groups containing between about 1 to about 4 carbon atoms.

16. The method according to claim 12 wherein the α-alkylstyrene is selected from the group consisting of α-methylstyrene and α-ethylstyrene.

17. The method according to claim 12 wherein the ring-alkyl substituted α-alkylstyrene is selected from the group cosisting of mono- and diortho-, mono- and dimeta-, and para-alkyl-, α-alkylstyrenes, and α-methyldialkyl styrene, wherein the ring-substituted alkyl group has at least two carbons.

18. The method according to claim 17 wherein the ring-alkyl substituted α-alkylstyrene is selected from the group consisting of ortho-ethyl-α-alkylstyrene, para-ethyl-a-alkylstyrene, or para-tertiary butyl-α-alkylstyrene.

19. A product made by the process of claim 1.

20. A product made by the process of claim 2.

* * * * *